United States Patent
Campanelli et al.

(10) Patent No.: US 9,415,990 B2
(45) Date of Patent: Aug. 16, 2016

(54) BAG-IN-BOX SYSTEM FOR USE IN DISPENSING A PUMPABLE PRODUCT

(71) Applicant: Cryovac, Inc., Duncan, SC (US)

(72) Inventors: John Richard Campanelli, Greer, SC (US); Thomas Duane Kennedy, Simpsonville, SC (US); Elizabeth Roberson McGee, Moore, SC (US); Daniel Lee McKamy, Simpsonville, SC (US); Jeffrey Linyard Walker, Easley, SC (US)

(73) Assignee: Cryovac, Inc., Charlotte, NC (US)

(*) Notice: Subject to any disclaimer, the term of this patent is extended or adjusted under 35 U.S.C. 154(b) by 0 days.

(21) Appl. No.: 14/077,303

(22) Filed: Nov. 12, 2013

(65) Prior Publication Data

US 2014/0224836 A1   Aug. 14, 2014

Related U.S. Application Data

(60) Provisional application No. 61/764,244, filed on Feb. 13, 2013.

(51) Int. Cl.
| | |
|---|---|
| B65D 35/56 | (2006.01) |
| B67D 1/00 | (2006.01) |
| B32B 27/10 | (2006.01) |
| B32B 27/30 | (2006.01) |
| B32B 27/32 | (2006.01) |
| B32B 27/34 | (2006.01) |

(Continued)

(52) U.S. Cl.
CPC .............. *B67D 1/0001* (2013.01); *B32B 27/10* (2013.01); *B32B 27/306* (2013.01); *B32B 27/32* (2013.01); *B32B 27/34* (2013.01); *B65D 77/067* (2013.01); *B31B 2219/9054* (2013.01); *B31B 2221/05* (2013.01); *B65B 3/045* (2013.01)

(58) Field of Classification Search
CPC .................... B67D 2001/0827; B67D 1/0004; B65D 77/06; B65D 77/065
USPC ......... 222/105; 383/109, 113; 428/35.9, 36.7, 428/36.91, 36.92
See application file for complete search history.

(56) References Cited

U.S. PATENT DOCUMENTS

| | | | | |
|---|---|---|---|---|
| 3,226,002 | A | * | 12/1965 | Walker ........................ 229/117.3 |
| 3,791,915 | A | * | 2/1974 | Goehring et al. ........... 428/476.3 |
| 4,274,554 | A | * | 6/1981 | Malpas ......................... 222/107 |

(Continued)

OTHER PUBLICATIONS

"Bag-in-box, liquid product", Packaging Technology, Oct. 21, 2011, pp. 1-8.

*Primary Examiner* — Kevin P Shaver
*Assistant Examiner* — Michael J Melaragno
(74) *Attorney, Agent, or Firm* — Rupert B. Hurley, Jr.

(57) ABSTRACT

A bag-in-box system for use in dispensing a pumpable product includes a carton, a flexible thermoplastic pouch disposed in the carton, a spout joined to the pouch, a spout closure, and a pumpable product disposed in the pouch, the flexible thermoplastic pouch including an outer wall including a coextruded film having a polyethylene layer, a tie layer, and a polyamide layer, and a discrete inner wall including an ethylene polymer or copolymer, or a composition like that of the outer wall, the outer wall sealed to the inner wall at the perimeter of the pouch. Optionally, a discrete intermediate wall can be disposed between the outer wall and inner discrete wall of the pouch. The system can further include a pump operatively connected to the pouch and carton to dispense the pumpable product from the pouch.

17 Claims, 3 Drawing Sheets

(51) Int. Cl.
*B65D 77/06* (2006.01)
*B65B 3/04* (2006.01)

(56) References Cited

U.S. PATENT DOCUMENTS

| | | | | |
|---|---|---|---|---|
| 4,322,018 A * | 3/1982 | Rutter | | 222/83 |
| 4,375,864 A * | 3/1983 | Savage | | 222/81 |
| 4,547,427 A * | 10/1985 | Engelsberger | | 428/349 |
| 4,612,221 A * | 9/1986 | Biel et al. | | 428/35.4 |
| 4,661,401 A * | 4/1987 | Akao | | 428/215 |
| 4,671,986 A * | 6/1987 | Clementini et al. | | 428/216 |
| 4,746,562 A | 5/1988 | Fant | | |
| 4,755,402 A * | 7/1988 | Oberle | | 428/34.9 |
| 4,795,062 A * | 1/1989 | Bedwell et al. | | 222/92 |
| 4,801,486 A * | 1/1989 | Quacquarella et al. | | 428/34.9 |
| 4,853,265 A * | 8/1989 | Warren | | 428/34.9 |
| 4,863,770 A * | 9/1989 | Knox et al. | | 428/35.7 |
| 4,893,731 A * | 1/1990 | Richter | | 222/92 |
| 4,897,301 A * | 1/1990 | Uno et al. | | 428/209 |
| 4,909,726 A * | 3/1990 | Bekele | | 428/34.3 |
| 4,957,968 A * | 9/1990 | Adur et al. | | 525/74 |
| 4,960,648 A * | 10/1990 | Yamada | | 428/476.3 |
| 4,998,990 A * | 3/1991 | Richter et al. | | 222/92 |
| 5,032,488 A * | 7/1991 | Finter | | 430/270.1 |
| 5,037,683 A * | 8/1991 | Schirmer | | 428/36.7 |
| 5,061,572 A * | 10/1991 | Hamada et al. | | 428/215 |
| 5,083,678 A * | 1/1992 | Waring | | 222/92 |
| 5,154,319 A * | 10/1992 | Deininger et al. | | 222/105 |
| 5,296,291 A * | 3/1994 | Mueller | | 428/349 |
| 5,425,996 A * | 6/1995 | Wilkie et al. | | 428/461 |
| 5,427,997 A * | 6/1995 | Oshima et al. | | 503/227 |
| 5,480,690 A * | 1/1996 | Stenger et al. | | 428/34.8 |
| 5,595,623 A * | 1/1997 | Lulham et al. | | 156/244.14 |
| 5,598,952 A * | 2/1997 | Daansen | | 222/105 |
| 5,679,422 A * | 10/1997 | Lind et al. | | 428/34.8 |
| 5,750,216 A * | 5/1998 | Horino et al. | | 428/34.3 |
| 5,766,772 A * | 6/1998 | Ciocca et al. | | 428/516 |
| 5,826,752 A * | 10/1998 | Latimer | | 222/105 |
| 5,830,603 A * | 11/1998 | Oka et al. | | 429/249 |
| 5,837,335 A * | 11/1998 | Babrowicz | | 428/34.9 |
| 5,852,118 A * | 12/1998 | Horrion et al. | | 525/90 |
| 5,853,862 A * | 12/1998 | Murai et al. | | 428/215 |
| 5,897,941 A * | 4/1999 | Shah | | 428/213 |
| 6,025,079 A * | 2/2000 | Ciocca et al. | | 428/515 |
| 6,045,924 A * | 4/2000 | Bekele | | 428/518 |
| 6,056,157 A * | 5/2000 | Gehl et al. | | 222/94 |
| 6,060,136 A * | 5/2000 | Patrick et al. | | 428/35.2 |
| 6,106,935 A * | 8/2000 | Lambert et al. | | 428/220 |
| 6,110,600 A * | 8/2000 | Ramesh | | 428/476.9 |
| 6,294,602 B1 * | 9/2001 | Shimo et al. | | 524/394 |
| 6,346,285 B1 * | 2/2002 | Ramesh | | 426/105 |
| 6,365,245 B2 * | 4/2002 | Blinka et al. | | 428/35.7 |
| 6,379,812 B1 * | 4/2002 | Hofmeister et al. | | 428/474.4 |
| 6,406,797 B1 * | 6/2002 | VanPutte | | 428/515 |
| 6,420,046 B1 * | 7/2002 | Shah et al. | | 428/475.5 |
| 6,485,806 B1 * | 11/2002 | Tateyama et al. | | 428/36.9 |
| 6,485,842 B1 * | 11/2002 | Shindome et al. | | 428/522 |
| 6,500,559 B2 * | 12/2002 | Hofmeister et al. | | 428/474.4 |
| 6,524,720 B1 * | 2/2003 | Shah | | 428/516 |
| 6,579,584 B1 * | 6/2003 | Compton | | 428/35.7 |
| 6,599,639 B2 * | 7/2003 | Dayrit et al. | | 428/475.8 |
| 6,699,549 B1 * | 3/2004 | Ueyama et al. | | 428/36.7 |
| 6,716,499 B1 * | 4/2004 | Vadhar | | 428/35.3 |
| 6,739,113 B1 * | 5/2004 | Kocher et al. | | 53/442 |
| 6,773,796 B1 * | 8/2004 | Di Cesare et al. | | 428/316.6 |
| 6,780,373 B1 * | 8/2004 | Musco | | 264/555 |
| 6,984,442 B2 * | 1/2006 | Brebion et al. | | 428/212 |
| 7,553,528 B1 * | 6/2009 | Biddiscombe | | 428/35.7 |
| 7,645,505 B2 * | 1/2010 | Bekele et al. | | 428/220 |
| 7,736,726 B2 * | 6/2010 | McAllister et al. | | 428/212 |
| 8,021,049 B2 * | 9/2011 | Smith | | 383/200 |
| 8,075,188 B2 * | 12/2011 | Plunkett et al. | | 383/119 |
| 8,129,007 B2 * | 3/2012 | Forloni | | 428/34.9 |
| 8,178,210 B2 * | 5/2012 | Forloni et al. | | 428/483 |
| 8,206,796 B2 * | 6/2012 | Opusko et al. | | 428/34.9 |
| 8,273,447 B2 * | 9/2012 | Forloni | | 428/212 |
| 8,459,503 B2 * | 6/2013 | Groesbeck | | 222/105 |
| 8,541,081 B1 * | 9/2013 | Ranganathan et al. | | 428/35.7 |
| 8,834,977 B2 | 9/2014 | Bellmore et al. | | |
| 2003/0155372 A1 * | 8/2003 | Yorn et al. | | 222/105 |
| 2003/0213813 A1 * | 11/2003 | Cook et al. | | 222/105 |
| 2004/0022995 A1 * | 2/2004 | Araki et al. | | 428/96 |
| 2004/0049006 A1 * | 3/2004 | Aramaki et al. | | 528/335 |
| 2004/0053066 A1 * | 3/2004 | Cretekos et al. | | 428/515 |
| 2004/0059064 A1 * | 3/2004 | Usui et al. | | 525/309 |
| 2004/0089672 A1 * | 5/2004 | Crosland et al. | | 222/105 |
| 2004/0126524 A1 * | 7/2004 | Longo et al. | | 428/36.5 |
| 2005/0017011 A1 * | 1/2005 | Andrews, Sr. | | 220/495.06 |
| 2005/0184105 A1 * | 8/2005 | Johnson | | 222/568 |
| 2005/0217932 A1 * | 10/2005 | Woodman et al. | | 181/290 |
| 2006/0071021 A1 * | 4/2006 | Steeves et al. | | 222/105 |
| 2006/0085080 A1 * | 4/2006 | Bechgaard et al. | | 623/23.43 |
| 2006/0093906 A1 * | 5/2006 | Yamashita et al. | | 429/176 |
| 2006/0097005 A1 * | 5/2006 | Hill et al. | | 222/105 |
| 2006/0115613 A1 * | 6/2006 | Dawe et al. | | 428/35.2 |
| 2006/0115667 A1 * | 6/2006 | Verrocchi | | 428/517 |
| 2006/0228503 A1 * | 10/2006 | Havens et al. | | 428/35.7 |
| 2007/0039974 A1 * | 2/2007 | Lloyd | | 222/105 |
| 2007/0073007 A1 * | 3/2007 | Harashina | | 525/472 |
| 2007/0092744 A1 * | 4/2007 | Di Tella et al. | | 428/475.8 |
| 2007/0145072 A1 * | 6/2007 | Cook et al. | | 222/105 |
| 2007/0275196 A1 * | 11/2007 | Opuszko | | 428/35.2 |
| 2008/0078781 A1 * | 4/2008 | Py et al. | | 222/96 |
| 2008/0083788 A1 * | 4/2008 | Py et al. | | 222/207 |
| 2009/0061057 A1 * | 3/2009 | Beckwith et al. | | 426/324 |
| 2009/0061061 A1 * | 3/2009 | Beckwith et al. | | 426/546 |
| 2009/0061062 A1 * | 3/2009 | Beckwith et al. | | 426/546 |
| 2009/0081452 A1 * | 3/2009 | Husemann et al. | | 428/346 |
| 2009/0104426 A1 * | 4/2009 | Sauer et al. | | 428/221 |
| 2009/0147196 A1 * | 6/2009 | Horie et al. | | 349/122 |
| 2009/0246415 A1 * | 10/2009 | Horie et al. | | 428/1.3 |
| 2009/0283541 A1 * | 11/2009 | Compton et al. | | 222/105 |
| 2009/0317611 A1 * | 12/2009 | Mueller et al. | | 428/212 |
| 2010/0003377 A1 * | 1/2010 | Brennan et al. | | 426/106 |
| 2010/0014787 A1 * | 1/2010 | Katada et al. | | 383/63 |
| 2012/0195526 A1 * | 8/2012 | Moehlenbrock et al. | | 383/42 |
| 2012/0195531 A1 * | 8/2012 | Moehlenbrock et al. | | 383/109 |
| 2012/0199615 A1 * | 8/2012 | O'Keefe et al. | | 222/505 |
| 2012/0202029 A1 * | 8/2012 | Ohnishi | | 428/213 |
| 2012/0318698 A1 * | 12/2012 | Bekele | | 206/524.1 |
| 2013/0074454 A1 * | 3/2013 | Babrowicz | | 53/467 |

* cited by examiner

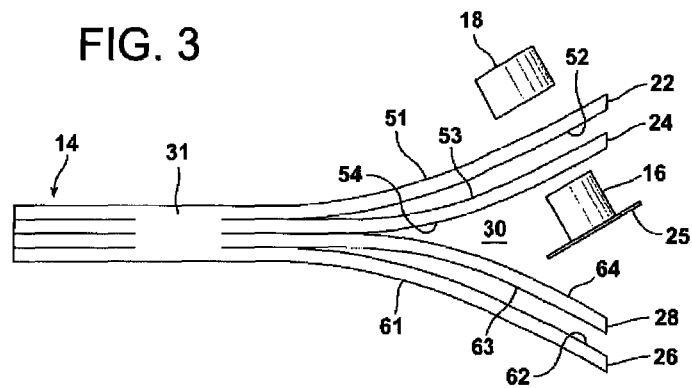
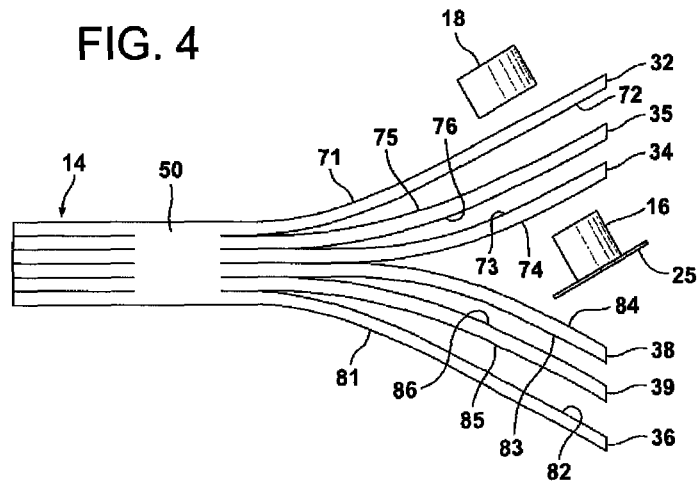

_US 9,415,990 B2_

BAG-IN-BOX SYSTEM FOR USE IN DISPENSING A PUMPABLE PRODUCT

This application claims the benefit of U.S. Provisional Application No. 61/764,244, filed Feb. 13, 2013, that application incorporated herein by reference in its entirety.

FIELD OF THE INVENTION

This invention relates to a bag-in-box system for use in dispensing a pumpable product, comprising a carton, a flexible thermoplastic pouch, a spout joined to the pouch, a spout closure, and a pumpable product disposed in the pouch.

BACKGROUND OF THE INVENTION

Collapsible thermoplastic pouches are often used to store pumpable products. The pouches are typically housed in a corrugated paperboard or other rigid or substantially rigid carton to aid in the transporting, handling and dispensing of the product. Such systems are commonly referred to as "bag-in-box" (BiB) packaging systems, and include a carton, a flexible pouch, a spout joined to the pouch, a spout closure, and a pumpable product disposed in the pouch.

A number of BiB applications require pouches with a combination of high barrier and toughness during processing, shipping, and handling.

For bag-in-box applications, multi-ply laminates having metallized polyester substrates are sometimes employed as at least a portion of the pouch material, sometimes with a polyethylene liner. Also used are barrier films having a coextruded multilayer construction.

However, the current systems for dispensing pumpable products often suffer from one of two problems.

A shortcoming with metallized pouch materials is the occurrence of pin-holes in the pouch due to flex cracking. This phenomenon, sometimes caused by vibrational stresses imparted during shipping and distribution of filled pouches, can compromise the oxygen barrier properties of the pouch, and in turn adversely affect the shelf life of the contents of the pouch.

Coextruded multilayer barrier films used in pouch construction can sometimes lack sufficient toughness in terms of burst strength.

Accordingly, there remains a need in the art for a bag-in-box system for use in dispensing pumpable products that satisfactorily addresses the above-noted deficiencies in prior art systems.

SUMMARY OF THE INVENTION

In a first aspect, a bag-in-box system for use in dispensing a pumpable product comprises a) a carton, b) a flexible thermoplastic pouch disposed in the carton, c) a spout joined to the pouch, d) a spout closure, and e) a pumpable product disposed in the pouch;

wherein the flexible thermoplastic pouch comprises
i) an outer wall comprising a coextruded film comprising
  (a) an outer heat-sealable layer comprising an ethylene polymer or copolymer;
  (b) a first tie layer disposed between the heat-sealable layer and a first intermediate layer, the tie layer comprising a chemically modified polyolefinic adhesive;
  (c) a first intermediate layer comprising a polyamide;
  (d) a core layer bonded to said first intermediate layer comprising an ethylene vinyl alcohol copolymer or a chemically modified polyolefinic adhesive;
  (e) a second intermediate layer bonded to said core layer, and comprising a polyamide; and
  (f) a second tie layer bonded to the second intermediate layer comprising a self-weldable chemically modified polyolefinic adhesive;
wherein the film is a collapsed lay-flat tubular film; and
ii) a discrete inner wall comprising ethylene polymer or copolymer;
the outer wall sealed to the discrete inner wall at the perimeter of the pouch.

In a second aspect, a system like that for the first aspect described above is provided, but in which the outer wall further comprises an abuse-resistant layer disposed between the heat-sealable layer and the first tie layer, comprising a material selected from very low density polyethylene, ethylene vinyl acetate copolymer with a fractional melt index, and ionomer.

In alternative aspects numbered 3 through 8 below, a system like for the first or second aspects as described above is provided, but in which the outer wall instead comprises a coextruded film comprising any of the following constructions:

3. polyamide(PA)/tie/polyethylene(PE)
4. PE/tie/PA/tie/PA/tie/PE
5.     PE/tie/PA/tie/PA/tie/PE//PE/tie/PA/tie/PA/tie/PE, where this structure is a collapsed tubular lay-flat film with self-welding of the PE//PE adjacent layers.
6. PA/ethylene vinyl alcohol copolymer (EVOH)/tie/PE
7. PE/tie/PA/EVOH/PA/tie/PE
8. PE/tie/PA/EVOH/PA/tie/PE//PE/tie/PA/EVOH/PA/tie/PE, where this structure is a collapsed tubular lay-flat film with self-welding of the PE//PE adjacent layers.

In a ninth aspect, a system like that for any of the first through eighth aspects described above is provided, but in which the discrete inner wall comprises substantially the same composition as the outer wall.

In a tenth aspect, a system like that for any of the first through ninth aspects described above is provided, but further comprising a discrete intermediate wall, disposed between the outer wall and the discrete inner wall, comprising either ethylene polymer or copolymer, or substantially the same composition as the outer wall.

In an eleventh aspect, a method of making a bag-in-box system for use in dispensing a pumpable product comprises providing a pouch as described above for any of the first through tenth aspects; installing a spout in the pouch, the spout comprising an inner end and an outer end; filling the pouch with a pumpable product; installing a spout closure on the outer end of the spout; and placing the pouch in a carton.

BRIEF DESCRIPTION OF THE DRAWINGS

The present invention is illustrated by reference to the following drawings, encompassing different embodiments of the invention, wherein:

FIG. 3 is a schematic cross-sectional, blown-up partial view of an embodiment of a pouch for use in the invention;

FIG. 4 is a schematic cross-sectional, blown-up partial view of another embodiment of a pouch for use in the invention.

DEFINITIONS

Figure 1:
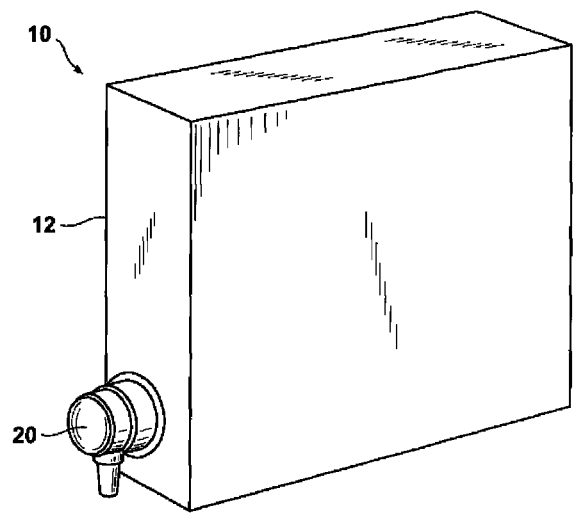
FIG. 1 is a perspective view of a bag-in-box system for use in dispensing a pumpable product.

As used herein:

"aseptic" and the like refers to a process wherein a sterilized pouch is filled with a sterilized pumpable product, such as a food product, in a hygienic environment. The pumpable product is thus rendered shelf stable in normal nonrefrigerated conditions; "aseptic" is also used herein to refer to the resulting filled and closed pouch. The pouch or pouch material, and the pumpable product, are typically separately sterilized before filling.

"carton" and the like includes a box, drum, crate or any other container that can suitably enclose and house a flexible thermoplastic pouch.

"discrete" and the like with respect to the inner wall is used herein to mean independently made (the inner wall is not an integral part of the outer wall when the outer wall is made) or constituting a separate entity from the outer wall. Likewise, the intermediate wall, if present, is independently made (the intermediate wall is not an integral part of the outer or inner walls when the outer or inner walls are made) or constitutes a separate entity from the outer or inner walls.

"EVOH" and the like refers to conventional ethylene/vinyl alcohol copolymer, i.e. an ethylene copolymer made up of repeating units of ethylene and vinyl alcohol, typically made by hydrolyzing an ethylene-vinyl acetate copolymer. "EVOH" additionally or alternatively refers to an active oxygen barrier composition that is a blend of a thermoplastic resin (a) having carbon-carbon double bonds substantially in its main chain, a transition metal salt (b), an oxygen barrier polymer (c) comprising conventional ethylene vinyl alcohol copolymer, and optionally a compatibilizer (d). The oxygen barrier polymer may comprise about 70 to 99% by weight of the composition, and the thermoplastic resin having carbon-carbon double bonds typically comprises from about 1 to 30 weight % of the polymeric portion of the composition. When present, the compatibilizer typically comprises about 0.1 to 29 weight % of the total polymeric portion of the composition. Suitable active oxygen barrier compositions are described in greater detail in U.S. Patent Publication Nos. 2006/0281882 and 2005/0153087, the contents of which are hereby incorporated by reference in their entirety.

"filled" and the like refers to a pouch that has been loaded with a pumpable product in a manner consistent with commercial filling operations, and is fully or partially filled.

"inner" and the like generally refers to a surface, wall, etc. closer to the pumpable product; "outer" and the like refers to a surface, wall, etc. farther from the pumpable product.

"polyamide" and the like refers to amidic polymers and copolymers.

"polyethylene" or "PE" and the like refers to ethylene homopolymer or copolymer.

"polymer" and the like (and specific recited polymers) refers to the product of a polymerization reaction, and is inclusive of homopolymers, copolymers, terpolymers, etc.

"pumpable product" and the like refers to a food or non-food that can be transported by gravity or by conventional mechanical or pneumatic pumping means from a pouch. Examples include dairy products, low and high viscosity fluids, fluid/solid mixtures (e.g., soups), gels, flavored toppings, sauces, liquid condiments such as ketchup, mustard, and mayonnaise, soft drink syrup, fruit juice, as well as personal care items and chemicals.

"seal" and the like refers to any seal of a first region of a film surface to a second region of a film surface, wherein the seal is formed by heating the regions to at least their respective seal initiation temperatures. Heating can be performed by any suitable means, such as using a heated bar, hot air, infrared radiation, radio frequency radiation, ultrasonic sealing, etc.

"tie layer" and the like refers to an internal film layer that adheres two layers to one another, and comprises a modified polyolefin, e.g., modified ethylene-vinyl acetate copolymer (EVA), or modified heterogeneous or homogeneous ethylene/alpha-olefin copolymer (EAO); e.g. maleic anhydride grafted linear low density polyethylene, maleic anhydride grafted low density polyethylene, or maleic anhydride grafted EVA.

DETAILED DESCRIPTION OF THE INVENTION

Figure 2:
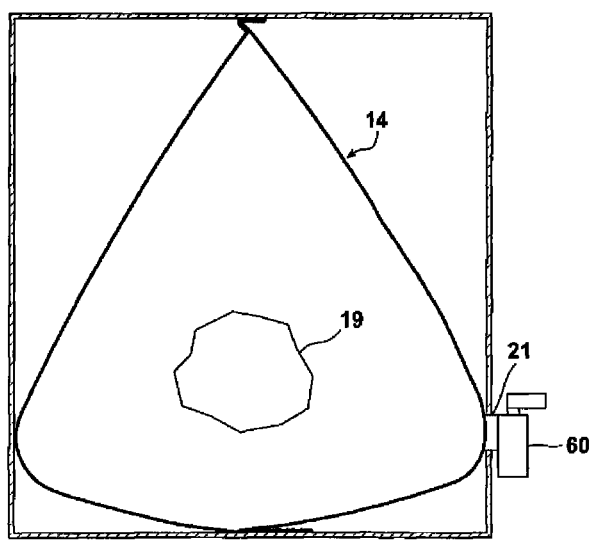
FIG. 2 is a schematic cross-sectional view of an alternative embodiment of the system.

FIGS. 1 through 4 show a bag-in-box system 10 for use in dispensing a pumpable product 19, including a carton 12, a flexible thermoplastic pouch 14, a spout 16, a spout closure 18, and optionally a pump 20 or 60. The pouch 14, containing the pumpable product 19, with spout 16 and spout closure 18, are disposed in carton 12, as depicted in FIG. 2. Spout 16 is associated with pouch 12 such that in one embodiment pump 20 or 60 can be aligned with the spout to lock the pump into place so that product 19 can be dispensed from pouch 14. Pouch 14 can be produced in any appropriate size, depending on the product to be packaged. For example, a 0.5 pint to 5 gallon size can be made. The pouch size and shape, and location of the spout on the pouch can be selected to suit existing carton and pump systems. A hole 21 in carton 12 allows access and a connection of spout 16 with pump 20 or 60.

FIG. 3 shows in exploded view an embodiment of a portion of pouch 14 that includes an outer wall 22 having outer surface 51 and inner surface 52; a discrete inner wall 24 having outer surface 53 and inner surface 54; an outer wall 26 having outer surface 61 and inner surface 62; and a discrete inner wall 28 having outer surface 63 and inner surface 64. Seals 31 bond together the walls 22, 24, 28, 26 at or near the edges of the pouch.

A spout 16 is positioned through walls 24 and 22, the spout flange 25 adhered to inner surface 54 of discrete inner wall 24, and the spout projecting through both walls 24 and 22. Spout closure 18 covers the outer end of spout 16.

FIG. 4 shows in exploded view an alternative embodiment of a portion of pouch 14 that includes an outer wall 32 having outer surface 71 and inner surface 72; a discrete inner wall 34 having outer surface 73 and inner surface 74; an outer wall 36 having outer surface 81 and inner surface 82; a discrete inner wall 38 having outer surface 83 and inner surface 84; a discrete intermediate wall 35 disposed between outer wall 32 and inner wall 34, having outer surface 75 and inner surface 76; and a discrete intermediate wall 39 disposed between outer wall 36 and inner wall 38, having outer surface 85 and inner surface 86. Seals 50 bond together the walls 32, 35, 34, 38, 39, 36, at or near the edges of the pouch.

Figure 5:
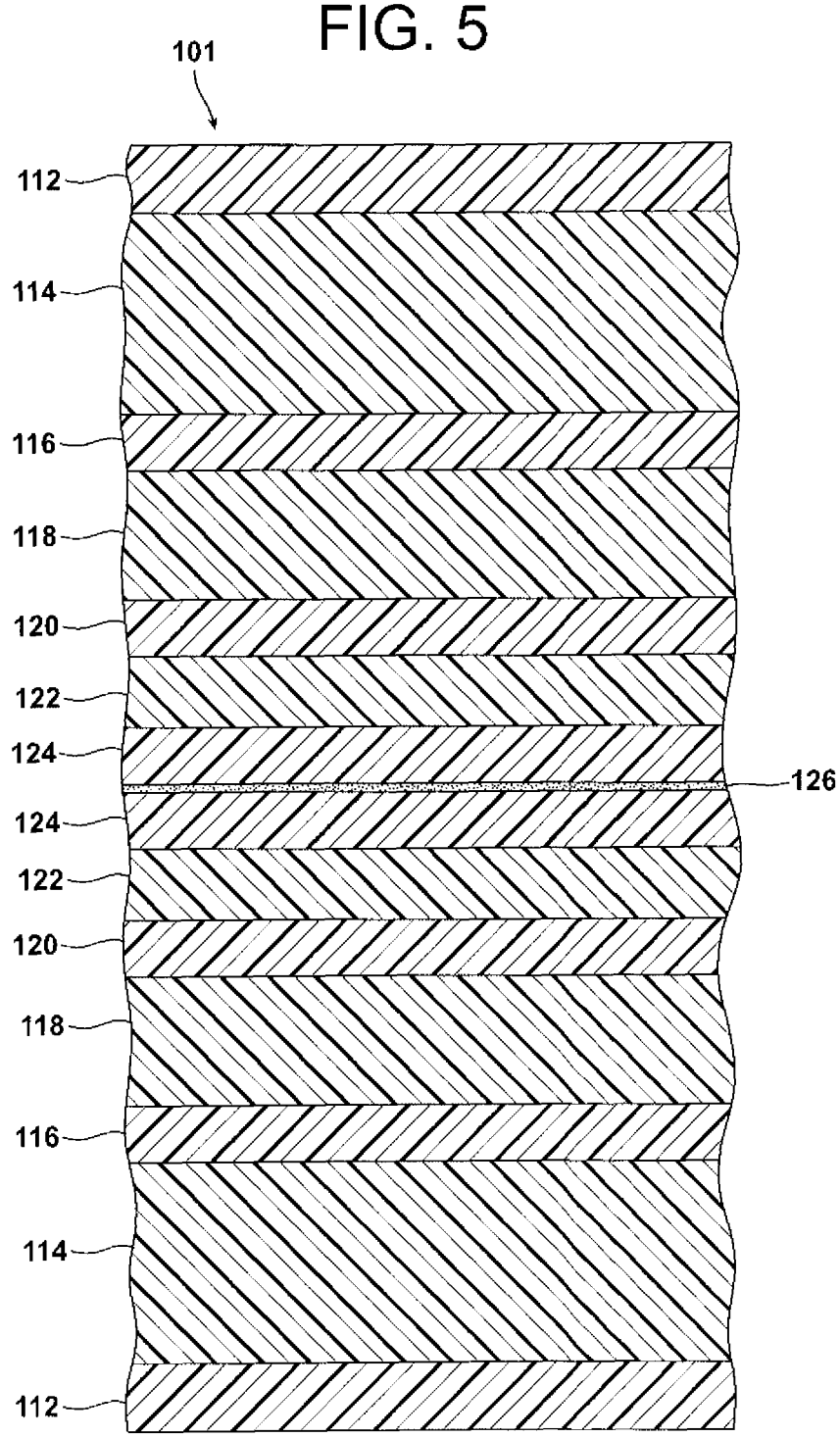
FIG. 5 is a schematic cross-section of a double wound, lay-flat tubular film for making a pouch for use in the invention.

Referring to FIG. 5, in one embodiment, outer walls 22, 26, 32, and 36 comprise a thermoplastic film 101 that includes a heat sealable layer 112 comprising an ethylene ester copolymer such as EVA, or EAO such as linear low density polyethylene, e.g. DOWLEX™ 3010 having a density of 0.921 grams/cc. Various additives such as antiblock or slip agents can optionally be included in layer 112 in minor amounts, for example between about 5 and 15% by weight of layer 112, sufficient to provide machinability or other desired properties depending on the end use of the packaging material, and the particular equipment in which the packaging material is used;

e.g., a masterbatch blend of about 90% low density polyethylene and about 10% colloidal silica may be used as an effective antiblock agent. An example is 10,075ACP™ Syloid concentrate available from Teknor Color.

Layer 114 comprises very low density polyethylene (VLDPE), e.g. ATTANE™ 4203 available from Dow, having a density of about 0.905 grams/cc. An alternative material for layer 114 is EVA with a fractional melt index (i.e. a melt index of less than about 1.0 grams/ten minutes) and a vinyl acetate content of at least about 12%. One such resin is ESCORENE™ LD 705.15 available from ExxonMobil, with a melt index of about 0.40 grams/10 minutes and a VA content of about 13% by weight. Ionomer resins such as those available from DuPont under the SURLYN trademark, comprising metal-salt neutralized ethylene acrylic or methacrylic acid copolymers, are also suitable for layer 114.

A first tie layer 116 is disposed between and bonds abuse layer 114 and a first intermediate layer 118 to be discussed below. Layer 116 comprises chemically modified polyolefin that bonds layers 114 and 118 together. An example is a maleic anhydride-modified EVA having a VA content of about 11% by weight, e.g. PLEXAR™ PX 1007 available from Lyondell Basell. Optionally, a minor amount, for example between about 5 and 15% by weight of layer 116, of a second thermoplastic resin can be included in layer 116, e.g. a single-site catalyzed ethylene/octene copolymer such as AFFINITY™ KC 8852G plastomer available from Dow Chemical, and having a density of about 0.875 grams/cc.

A first intermediate layer 118 is adhered to tie layer 116, and also adhered to core layer 120. This layer comprises a polyamide such as nylon 6, or copolyamide such as nylon 6/66, 6/69 or nylon 6/12. Optionally, a minor amount, for example between about 5 and 15%, by weight of layer 118, of a second thermoplastic resin can be included in layer 118, e.g. a blend of an ionomer resin and a polyamide, such as SURLYN™ AM7927 available from DuPont.

The core layer 120 comprises EVOH. EVOH resins can have various ethylene contents, e.g. at least about 38 mole % ethylene, such as SOARNOL™ ET3803 available from Nippon Gohsei.

On the surface of the core layer 120 opposite the first intermediate layer 118 is the second intermediate layer 122 comprising a polyamide or copolyamide such as those described herein for first intermediate layer 118.

A second tie layer 124 represents a self-weldable layer comprising the same material as that used in layer 116, although different chemically modified polymeric adhesives could be used for layers 116 and 124 respectively. When the tubular coextruded film 101 is collapsed, self-weldable layers 124 will weld together.

Interface 126 represents the point of contact between self-weldable layers 124 when the tubular film is collapsed.

In a first alternative embodiment, a film is provided like that of FIG. 5, but without layer 114; tie layer 116 is bonded directly to heat sealable layer 112.

In a second alternative embodiment, a film is provided like that of FIG. 5, or like that of the first alternative embodiment, but in which core layer 120 comprises a chemically modified polyolefinic adhesive.

In a process for producing these films, melt streams for each of the resins of layers 112 through 124 of FIG. 5 are produced and coextruded through an annular die to form a tubular extrudate. The extrudate is hot blown, cooled and then collapsed to form a layflat tubular film. Thus, the self-weldable material of layers 124 (FIG. 5) is welded to itself at the interior collapsed interface 126 of the film.

The walls used to construct the pouch can have any total thickness desired, so long as the pouch provides the desired properties for the packaging operation in which the pouch is used. Thermoplastic films used to make the walls can be manufactured by coextrusion thermoplastic film-forming processes known in the art. The film can be oriented or non-oriented.

Spout 16

Spout 16 can be disposed at any suitable location in the pouch, and can function both as a device for filling the pouch, and as a device to cooperate and associate with pump 20 or 60 to allow discharge of the pumpable product from pouch 14. Alternatively, spout 16 can function as a device for filling the pouch, and a separate pump or dispensing device can be installed at a separate location on the pouch for dispensing the pumpable product from the pouch.

Carton 12

Carton 12 can be formed by folding and sealing a pre-cut blank by methods well known in the art. Suitable materials from which the blank can be made include coated or uncoated paperboard, which can include as a component bleached or unbleached pulp; plastics such as polyolefins, polycarbonates, vinyl polymers, polyesters and acrylics; etc. Examples of these are solid bleached sulfate paperboard (SBS), clay-coated newsback (CCNB), coated solid unbleached sulfate (SUS), multi-ply folding box board or kraft paperboard, etc. In some embodiments, the blank can comprise materials suitable for printing. The carton can be constructed by hand or mechanically in any suitable manner. For example, a conventional unfolded blank can be used to construct a single piece tray-style box container; or the carton can be made with parts that are molded separately and then joined by any suitable method.

Either before or after pouch 14 is filled, the pouch can be inserted into carton 12.

Pump 20 or 60

A delivery mechanism, such as a pump, can be associated with pouch 14 and carton 12 to dispense the contents of the pouch. In some embodiments, the pump can include a piercing portion to contact, pierce, and/or interlock with spout 16. Thus, the pump can have a conical or piercing portion matched to the spout. The precise construction of the pump for use with pouch 14 can vary so long as it interlocks with spout 16 to dispense pouch contents, or alternatively can be attached to another portion of the pouch to access the pouch contents. Spout 16 can fasten and interlock with the pump to dispense pouch contents without leaks. In some embodiments, a piercing nozzle can be attached to a conventional drawing tube of a conventional pump device. Many alternative embodiments are possible, provided that spout 16, or another portion of the pouch, can be brought into direct or indirect communication or connected engagement with a pump. One means of connecting the pump to the pouch is via a dispensing tube, or alternatively a quick connect/disconnect coupler. Pump 20 or 60 can also comprise a dispensing means. The pump can have any suitable manual or mechanical actuated valve or pumping system, e.g. a "clothes-pin" style valve. When the viscosity of packaged product is such that the product cannot be dispensed by gravity forces only and/or when an accurate flow control of the product to be dispensed is desired, a pump assembly can be used. For example, a volumetric positive displacement pump assembly, as is well known in the art, can be used with the disclosed dispensing system.

Method of Making Pouches

The pouch, with spout and spout closure, can be made by any suitable process. In one embodiment, a four lane pouch making machine from Maverick Engineering S.A. is used. In the process of making pouches, the following steps can be followed:

a) four webs are provided, each mounted on a respective roll, at an upstream end of the machine and process, the first and fourth webs comprising e.g. the web depicted in FIG. 5, and the second and third webs comprising e.g. a monolayer low density polyethylene;

b) a first set of draw rollers intermittently advances the first and second webs, positioned such that the first web comprises an outer wall in the finished pouches, and the second web comprises an inner wall in the finished pouches; a second set of draw rollers advances the third and fourth webs, positioned such that the fourth web comprises an outer wall in the finished pouches, and the third web comprises an inner wall in the finished pouches;

c) holes are periodically stamped out in registration out of the first and second webs, the holes made "four across", i.e. four holes present across the lateral width of the webs at longitudinally and laterally spaced intervals, predetermined according to the anticipated individual pouch size and geometry, and intended location of each spout on a respective pouch, with the chads produced by this stamping step removed from the main production line;

d) a spout is supposited in each hole, and a seal applied at the flange of each spout, to seal each spout to the inner surface of the second web;

e) the four webs, with spouts supposited and sealed, are advanced, and a first and second continuous longitudinal side seal is made to the four webs at the first and second extreme lateral edges (running parallel to the process flow) of the webs, and three additional continuous intermediate longitudinal side seals are made to the four webs at spaced intermediate lateral positions on the webs, with the edge trim produced during production of the first and second continuous longitudinal side seals removed as scrap;

f) a third set of draw rollers advances the side sealed webs to a station where delta seals are optionally applied to the webs in a predetermined, registered, periodic fashion (a delta seal is a diagonal seal that is added to the webs at locations on the webs that will, at the end of the process, comprise the corners of individual pouches);

g) a spout closure (tap) is inserted and partially sealed to the first, projecting end, i.e. the outer end, of each respective spout;

h) a lateral end seal is applied to the webs at predetermined periodic intervals;

i) the four web lanes defined by the first and second continuous longitudinal side seals and three additional continuous intermediate longitudinal side seals are slit apart to define four side sealed precursor pouch laminations; and j) a fourth set of draw rollers advances the four side sealed precursor pouch laminations to a perforation station where lateral perforations are applied to each of the four side sealed precursor pouch laminations at predetermined spaced intervals.

An alternative to step j) is to advance the four side sealed precursor pouch laminations to a cutting station where the lamination are cut at predetermined spaced intervals to define individual pouches open at one end thereof.

The perforated pouch laminations, or cut individual pouches, can then be boxed and shipped to a processor for filling each pouch with a pumpable product, placing each filled pouch in a respective carton, and supplying the finished bag-in-box to a commercial customer or consumer. In the case of certain foodstuffs and the like, the perforated pouch laminations or cut individual pouches can be shipped to a sterilizer where the pouches can be sterilized, e.g. in an aseptic process, filled with a sterilized pumpable product, placed in a carton, and supplied to e.g. a retail outlet or restaurant.

EXAMPLES

Film formulations suitable for the outer walls, and in some embodiments the inner and/or intermediate walls of pouches made in accordance with the invention, including the film structures and thickness % of each layer, are identified below. Resins used in these films are identified in the list of Table 1.

TABLE 1

Resin Identification

| Material Code | Tradename Or Designation | Source(s) |
|---|---|---|
| AB1 | 10850 ™ | Ampacet |
| AB2 | 100458 ™ | Ampacet |
| AB3 | 100458 ™ Syloid Concentrate | Ampacet |
| AD1 | TYMOR ™1228B | Rohm & Haas |
| AD2 | PLEXAR ™ PX1007 | Equistar |
| IO1 | SURLYN ™ AM7927 | DuPont |
| OB1 | SOARNOL ™ SGN017B | Nippon Gohsei |
| OB2 | SOARNOL ™ ET3803 | Nippon Gohsei |
| PA1 | ULTRAMID ™B33LN01 | BASF |
| PA2 | ULTRAMID ™B40 01 | BASF |
| PE1 | DOWLEX ™ 2045.04 | Dow |
| PE2 | EB403AQ ™ | Westlake |
| PE3 | DOWLEX ™ 3010 | Dow |
| PE4 | ATTANE ™ 4203 | Dow |
| PE5 | AFFINITY ™KC8852G | Dow |

AB1 is a masterbatch having 86%, by weight of the masterbatch, of linear low density polyethylene, 13%, by weight of the masterbatch, of an antiblocking agent (silica in the form of diatomaceous earth), and 1%, by weight of the masterbatch, of a slip agent (erucamide).
AB2 is a masterbatch having about 97%, by weight of the material, of linear low density polyethylene, and about 3%, by weight of the masterbatch, of a fluoropolymer.
AB3 is a masterbatch having about 90%, by weight of the masterbatch, of low density polyethylene, and about 10%, by weight of the masterbatch, of an antiblocking agent (SYLOID ™ silica).
AD1 is a maleic anhydride-modified linear low density polyethylene.
AD2 is a maleic anhydride-modified ethylene/vinyl acetate copolymer, the EVA having
IO1 is a pre-blend of partially zinc neutralized ethylene/methacrylic acid copolymer (ionomer resin) and nylon 6.
OB1 is an ethylene/vinyl alcohol copolymer with an ethylene content of about 28 mole % ethylene.
OB2 is an ethylene/vinyl alcohol copolymer with from 30 to 40 mole % ethylene.
PA1 is a nylon 6 (poly(caprolactam)).
PA2 is a nylon 6 (poly(caprolactam)).
PE1 is a Ziegler/Natta catalyzed ethylene/1-octene copolymer having a density of 0.920 grams per cubic centimeter and a 1-octene content of 6.5% by weight of the copolymer . . .
PE2 is a low density polyethylene.
PE3 is a Ziegler/Natta catalyzed ethylene/1-octene copolymer having a density of 0.921 grams/cubic centimeter.
PE4 is an ethylene/1-octene copolymer with a density of 0.905 grams per cubic centimeter and a 1-octene content of 11.5% by weight of the copolymer.
PE5 is a single site catalyzed ethylene/octene copolymer plastomer having a density of 0.875 grams per cubic centimeter.

a vinyl acetate content of about 9% by weight, and a melt index of about 1.

All compositional percentages given herein are by weight, unless indicated otherwise.

Film Examples 1 and 2 were seven-layer coextruded films, similar in composition, with film example 1 having a total thickness of 4.5 mils, and film example 2 having a total thickness of 5.5 mils.

Film Examples 3 to 5 were each about 1 mil thick when coextruded as tubular seven-layer film, and collapsed in each case to make an approximately 2 mil thick film.

The thickness of each layer, as a percentage of the total thickness of the film of each example, is given below the composition of each layer.

Film Example 1

|  | Sealant | Tie layer | nylon layer | oxygen barrier | nylon layer | tie | Sealant |
|---|---|---|---|---|---|---|---|
| [FS8145] | 69% PE1 + 25% PE2 + 5% AB1 + 1% AB2 | AD1 | PA1 | OB1 | PA1 | AD1 | 69% PE1 + 25% PE2 + 5% AB1 + 1% AB2 |
| thickness % | 25 | 10 | 10 | 10 | 10 | 10 | 25 |
| Gauge (mils) | 1.13 | 0.45 | 0.45 | 0.45 | 0.45 | 0.45 | 1.13 |

Film Example 2

|  | Sealant | Tie layer | nylon layer | oxygen barrier | nylon layer | tie | Sealant |
|---|---|---|---|---|---|---|---|
| [FS8155] | 69% PE1 + 25% PE2 + 5% AB1 + 1% AB2 | AD1 | PA1 | OB1 | PA1 | AD1 | 69% PE1 + 25% PE2 + 5% AB1 + 1% AB2 |
| thickness % | 25 | 10 | 10 | 10 | 10 | 10 | 25 |
| Gauge (mils) | 1.38 | 0.55 | 0.55 | 0.55 | 0.55 | 0.55 | 1.38 |

Film Example 3

|  | Sealant | Abuse layer | Tie layer | nylon layer | oxygen barrier | nylon layer | tie |
|---|---|---|---|---|---|---|---|
| [HS 3000] | 90% PE3 + 10% AB3 | PE4 | AD2 | PA2 | OB2 | PA2 | AD2 |
| thickness % | 9.8 | 35.3 | 9.8 | 10.8 | 7.8 | 17.7 | 8.8 |

-continued

|  | Sealant | Abuse layer | Tie layer | nylon layer | oxygen barrier | nylon layer | tie |
|---|---|---|---|---|---|---|---|
| Gauge (mils) | 0.10 | 0.36 | 0.10 | 0.11 | 0.08 | 0.18 | 0.09 |

Film Example 4

|  | Sealant | Abuse layer | Tie layer | nylon layer | oxygen barrier | nylon layer | tie |
|---|---|---|---|---|---|---|---|
| [HS 3500] | 90% PE3 + 10% AB3 | PE4 | 90% AD2 + 10% PE5 | 90% PA2 + 10% IO1 | OB2 | 90% PA2 + 10% IO1 | 90% AD2 + 10% PE5 |
| thickness % | 14.0 | 34.0 | 9.0 | 13.0 | 8.0 | 13.0 | 9.0 |
| Gauge (mils) | 0.16 | 0.39 | 0.10 | 0.15 | 0.09 | 0.15 | 0.10 |

Film Example 5

|  | Sealant | Abuse layer | Tie layer | nylon layer | oxygen barrier | nylon layer | tie |
|---|---|---|---|---|---|---|---|
| [NLX4478] | 90% PE3 + 10% AB3 | PE4 | 90% AD2 + 10% PE5 | 90% PA2 + 10% IO1 | OB1 | 90% PA2 + 10% IO1 | 90% AD2 + 10% PE5 |
| thickness % | 14.0 | 34.0 | 9.0 | 13.0 | 8.0 | 13.0 | 9.0 |
| Gauge (mils) | 0.16 | 0.39 | 0.10 | 0.15 | 0.09 | 0.15 | 0.10 |

Test Results

Various films with selected spouts and spout closures (spouts with IDC, Unitap and Cap Taps), at a number of bag dimensions, spout positions, and lane configurations were tested.

Materials and Methods:

Table 2 summarizes the films tested, and Table 3 summarizes the spouts/closures (taps) tested.

TABLE 2

| Film | Part Number | Manufacturer |
|---|---|---|
| m-OPET* Laminate | XC3047 | Berry |
| Monolayer PE Liner | FEX305E43 | Berry |
| High Barrier Coex - 4.5 mil | FE1** | SAC |

TABLE 2-continued

| Film | Part Number | Manufacturer |
|---|---|---|
| High Barrier Coex - 5.5 mil | FE2 | SAC |
| Medium Barrier Coex - 2 mil | FE3 | SAC |

*m-OPET = metallized oriented PET
**FE = Film Example

TABLE 3

| spout and spout closure | Part Number | Manufacturer |
|---|---|---|
| PP* cap/tap assembly | 7507009909; 842042 | ITW |
| IDC ANSR | 1002196RS | Hoffer |
| Unitap | 3900800 | ITW |
| ITW Short Spout | 3960852 | ITW |
| PE Spout | 902 | Maierhofer |
| IDC Spout | 2001637 | Parish |
| IDC Spout | 7259-WH16CS | Hoffer |

*PP = polypropylene

Test Methods

Seal strength of the manufactured pouches was characterized in three ways during the test:
1. Peelability of seals by thumb insertion
   Pass=no peel
2. Failure mode during blow-up tests with compressed air
   Pass=pouch body blows out instead of seal delamination
3. 5-ft drop tests for water-filled packages
   Pass=survives three consecutive drops Instron tests were run on side and end seals for one of the package structures (Structure A in Table 4).

Results:

1. Machine Operation

A Maverick machine run according to vendor's specifications, generally in accordance with the description hereinabove re: the Method of Making Pouches, successfully manufactured the structures during the test. Pinch rollers were used on the bottom webs to smooth out wrinkles. Three lanes were run on all structures except Structure Z; four lanes were run on structure Z. Table 4 summarizes the structures run. Delta seals were applied in all four corners of pouches made from Structures L and X (50 cm×50 cm). For Structure 1, the spout/spout closure assembly was off-set to the leading/drive side edge of the pouch; for the remaining structures, the spout and closure were centered toward the leading edge of the pouch.

TABLE 4

| Structure | Outer Wall | Inner Wall | $L^1$, mm | $W^2$, mm | Tap | Spout | Spout Location | Delta Seals |
|---|---|---|---|---|---|---|---|---|
| 1 | m-PET | 2 mil-PE | 648 | 470 | IDC | ITW-short | Centered | no |
| A | FE1 | 2 mil-PE | 470 | 432 | IDC | ITW-short | Offset | no |
| B | FE2 | none | 470 | 432 | IDC | ITW-short | Offset | no |
| C | FE1 | 2 mil-PE | 470 | 432 | IDC | M-902 | Centered | no |
| F | FE2 | none | 470 | 432 | IDC | M-902 | Centered | no |
| L | FE1 | 2 mil-PE | 470 | 432 | IDC | Parish | Centered | 4 |
| X | FE1 | 2 mil-PE | 470 | 432 | Uni-Tap | Parish | Centered | 4 |
| Y | FE3 | 2 mil-PE | 470 | 432 | ITW Cap | ITW-short | Centered | no |
| Z | FE1 | 2 mil-PE | 663 | 330 | ITW Cap | ITW-short | Centered | no |

$^1$L = length
$^2$W = width

Some Issues were encountered with improper mating of spout closure to spout.

2. Pouch Properties

Thumb insertion to delaminate the seals was used to set the proper dwell times and sealing temperatures for the various sealing stations. Once the dwell times and temperatures were fixed, pouches were collected for burst and drop testing. Table 5 summarizes the test results for the pouches manufactured during this trial.

TABLE 5

| Structure | Burst Tests | Drop Tests |
|---|---|---|
| 1 | Side seal burst, no delamination | N/A |
| A | Body burst | N/A |
| B | Body burst | 50% Passed |
| C | Body burst | 67% Passed |
| F | Body burst | 44% Passed |
| L | Body Burst | 83% Passed |
| X | Body Burst | N/A |
| Y | Body Burst | 100% Passed |
| Z | Side seal burst, no delamination | N/A |

When pouch body bursts occurred, they usually initiated about mid-package and propagated quickly in the machine direction from seal to seal. These bursts occurred either on the spout side of the bag, or the non-spout side. It was observed for Structure Y, that the outer wall (FE3) was able to expand long after the PE inner wall failed during burst testing. This phenomenon (burst inner wall, intact outer wall) was observed only for Structure Y. The other outer webs burst more or less simultaneously with the PE liner.

The typical failure mechanism for five-foot drop tests was a seal burst—that is, a tear that propagated along the seal-pouch body interface. Delamination was not observed. For Structure B, the spout was offset from center so that its position was 64 mm from the leading edge and 64 mm from the DS (Delta seal) edge. For this package, the failures invariably occurred along the seals proximal to the spout position.

3. Instron Seal Strengths

Structure A (FE1/PE) was tested for Instron seal strengths. Several 25 mm strips were cut from end seals and side seals of pouches taken from all three lanes during the production run. The top webs (8145 and PE films) were clamped to one jaw, and the lower two webs (PE and FE1 films) were clamped to the second jaw. A jaw separation rate of 200 mm/min was used on three replicates per package location. In all cases, the film broke; no seal delaminations were observed. ANOVA analysis on the Maximum Load for the four seals in each package showed no significant difference at a significance level of $\alpha=0.05$. Therefore the Maximum Load data was pooled to calculate a mean value for each package. These results are shown in Table 6.

TABLE 6

| Lane | Maximum Load, N/25 mm | |
|---|---|---|
| | Mean | Standard Deviation |
| A | 115.3 | 5.35 |
| B | 111.6 | 5.65 |
| C | 110.9 | 7.02 |

There is no statistically significant difference among the means for the maximum load as a function of the lane in which the pouch was manufactured. The values of 110 to 115 N/25 mm are comfortably above the minimum value of 80 N/25 mm typically required for FS films.

4. Unrestrained Burst Test Results

An unrestrained burst test was performed on the following structure: FE4 (2.3 mil)//PE film (2.0 mil)//air//PE film (2.0 mil)//FE4 (2.3 mil), manufactured on a Maverick machine. Thus, the structure had two outer walls comprising the FE4 coextruded barrier film, and two inner walls comprising monolayer low density polyethylene. The inner walls comprising the 2 mil PE burst, yet the FE4 outer walls remained inflated and intact. Such behavior is not typically observed with fully coextruded blown or cast film structures, or laminations currently available from current suppliers of BiB materials.

5. Transportation Survivability Test Results

Shipping performance test ASTM 4169D was used to determine transportation survivability of pouches made from FE4 coextruded barrier film used as the two outer walls, with two 3 mil PE inner walls. Fifty pouches were filled with 8 liters of water each, and were placed in boxes, two pouches per box. Upon test completion, 66% of the pouches showed no signs of leakage. Pouch body failures (water leaking through holes created in walls of the pouch) existed in 34% of the bags. Interestingly, 20% of the pouches showed a leak in the PE inner wall, but not in the FE4 outer wall of the film. Because the outer wall was not compromised in these pouches, they would not result in failure of the package (primary loss), or secondary failures of the corrugated containers that would be stacked adjacent or below the leaking packaging. It is known in the BiB packaging industry that if leakage in a single BiB container occurs, the stack of palletized BiB containers can be damaged. The strength of the corrugated boxes can be seriously impaired by leaking liquid product. It is also known that pallets or even stacked pallets can collapse from the failure of a single BiB pouch.

The same shipping test was performed with FE5 as the two outer walls. These pouches were also 8 liters and had a 3 mil PE liner. In this case, pouches were irradiated (with specification of 30-50 kGy dosage). Upon test completion, 68% of the pouches showed no signs of leakage. Body failures existed in 32% of the pouches. As with the previous test involving FE4 as the two outer walls, 20% of the pouches showed a leak in the PE layer but not in the outer walls of the structure. These results indicate that transportation test results were not adversely affected by the use of irradiation.

BIB pouches which exist in the market place today were also tested using an ASTM 4169D procedure. These irradiated pouches had a 4 mil metallized PET outer layer and a 2 mil PE liner. The bag dimensions and box sizes were the same as those used for FE4 and FE5 film tests. Pouch body failures were observed in 74% of the samples. Because of the mPET outer layer, it was not possible to detect how many samples had a leak in the PE layer only. Table 7 below summarizes these results:

TABLE 7

| Films | FE4/PE | FE5/PE | mOPET/PE |
|---|---|---|---|
| Gauges | 2.3-mil/3-mil | 3-mil/3-mil | 4-mil/2-mil |
| Leakers (%) | 34 | 32 | 74 |
| Pass with liner leaks (%) | 20 | 20 | 0 |

6. Gelbo Flex Test Results

A Gelbo flex tester was used to compare the number of flexes to failure. A failure was indicated by a hole in the film, through which a colored dye would travel and become visible on a white background. FE4 films failed between 2500 and 2600 flexes. FE5 films failed between 1500 and 2000 flexes. Commercial mPET materials failed between 1400 and 1500 flexes.

Methods of using the Disclosed System

A filled pouch 14 in carton 12 can be delivered to an end user (e.g. a worker in a restaurant, or a consumer), after storage if necessary. In some embodiments, the end user can also be provided a pump for use with the particular pouch. When it is desired to dispense pumpable product 19 from pouch 14, pump 20 or 60 can be attached directly or indirectly to the pouch by insertion of a portion of the pump into the pouch, either at the location of the spout, or at another portion of the pouch, for retentive engagement with the pump.

The present application is directed in various embodiments to the subject matter described below. These are optional embodiments of any of the aspects of the invention as described hereinabove in the Summary of the Invention, and for each aspect, these features can be suitably included alone or in any suitable combination of these features:

the pouch of the dispensing system is absent a metallized layer.
the dispensing system further comprises a pump in connected relationship with the pouch.

What is claimed is:

1. A bag-in-box system for use in dispensing a pumpable product comprising:
a) a carton;
b) a flexible thermoplastic pouch disposed in the carton;

c) a spout joined to the pouch;
d) a spout closure, and
e) a pumpable product disposed in the pouch;

wherein the flexible thermoplastic pouch comprises
  i) an outer wall comprising a coextruded film comprising
    (a) an outer heat-sealable layer comprising an ethylene polymer or copolymer;
    (b) a first tie layer disposed between the heat-sealable layer and a first intermediate layer, the tie layer comprising a chemically modified polyolefinic adhesive;
    (c) a first intermediate layer comprising a polyamide;
    (d) a core layer bonded to said first intermediate layer comprising a chemically modified polyolefinic adhesive;
    (e) a second intermediate layer bonded to said core layer, and comprising a polyamide; and
    (f) a second tie layer bonded to the second intermediate layer comprising a self-weldable chemically modified polyolefinic adhesive;
  wherein the film is a collapsed lay-flat tubular film; and
  ii) a discrete inner wall comprising ethylene polymer or copolymer;
the outer wall sealed to the discrete inner wall at the perimeter of the pouch.

2. The system of claim 1 wherein the outer wall further comprises an abuse-resistant layer disposed between the outer heat-sealable layer and the first tie layer, comprising a material selected from the group consisting of very low density polyethylene, ethylene vinyl acetate copolymer with a fractional melt index, and ionomer resin.

3. The system of claim 1 wherein the outer heat-sealable layer comprises an ethylene polymer or copolymer selected from the group consisting of ethylene alpha-olefin copolymer, fractional melt index low density polyethylene, and an ethylene ester copolymer.

4. The system of claim 1 wherein the outer heat-sealable layer further comprises between 5 and 15%, by weight of the outer heat-sealable layer, of an antiblock agent.

5. The system of claim 1 wherein the first and second tie layers each comprises maleic anhydride-modified ethylene vinyl acetate copolymer.

6. The system of claim 1 wherein the first and second tie layers each further comprises between 5% and 15%, by weight of the respective tie layer, of a single-site catalyzed ethylene/octene copolymer.

7. The system of claim 1 wherein the first and second intermediate layers each comprises a copolyamide or nylon 6.

8. The system of claim 1 wherein the discrete inner wall comprises substantially the same composition as the outer wall.

9. The system of claim 1 further comprising a discrete intermediate wall, disposed between the outer wall and the discrete inner wall, comprising ethylene polymer or copolymer.

10. The system of claim 1 further comprising a discrete intermediate wall, disposed between the outer wall and the discrete inner wall, comprising substantially the same composition as the outer wall.

11. The system of claim 1 wherein the discrete inner wall is not sealed to the outer wall except at the perimeter of the pouch.

12. The system of claim 10 wherein the discrete intermediate wall is not sealed to the outer wall or the discrete inner wall except at the perimeter of the pouch.

13. The system of claim 1 wherein the pouch is absent a metallized layer.

14. The system of claim 2 wherein the pouch is absent a metallized layer.

15. The system of claim 10 wherein the pouch is absent a metallized layer.

16. The system of claim 1 further comprising a pump in connected relationship with the pouch.

17. The system of claim 16 wherein the carton comprises at least one opening adapted to hold and access the pouch with said pump.

* * * * *